United States Patent [19]

Hehl

[11] Patent Number: 5,375,993
[45] Date of Patent: Dec. 27, 1994

[54] PLASTICIZING ASSEMBLY FOR USE IN AN INJECTION MOLDING MACHINE FOR PROCESSING SYNTHETIC MATERIALS

[76] Inventor: Karl Hehl, Arthur-Hehl-Strasse 32 D-7298, Lossburg 1, Germany

[21] Appl. No.: 88,654

[22] Filed: Jul. 9, 1993

[30] Foreign Application Priority Data

Jul. 9, 1992 [DE] Germany ............... 4222432

[51] Int. Cl.⁵ .................................. B29C 45/23
[52] U.S. Cl. ........................... 425/562; 366/77; 425/564
[58] Field of Search ............... 425/562, 563, 564, 565, 425/566, 567; 366/77

[56] References Cited

U.S. PATENT DOCUMENTS 2,265,995 12/1941 Beyerlein ................. 425/563
3,915,358 10/1975 Hehl .

FOREIGN PATENT DOCUMENTS 2262589 9/1975 France .
2121270 11/1972 Germany .
4105731 6/1992 Germany .
4105730 9/1992 Germany .

Primary Examiner—Tim Heitbrink
Attorney, Agent, or Firm—Spencer, Frank & Schneider

[57] ABSTRACT

A plasticizing assembly for use in an injection molding machine for processing synthetic materials having a plasticizing cylinder at which a nozzle body is mounted and that is provided with a rotatable feed screw disposed in a cylindrical chamber with an inside diameter substantially corresponding to the diameter of the feed screw. The inside diameter of the nozzle body section is tapered to the inside diameter of the nozzle channel, taking as starting point the rear end diameter in a transition section between the plasticizing cylinder and the nozzle body. A chamber is provided in the transition section between the plasticizing cylinder and the nozzle body for spatial fixing of an adapter, which has an outlet transversely disposed with respect to an injection axis and which adapts the inside diameter of the chamber to the rear end diameter of the nozzle body. In such an arrangement, the plasticizing cylinder can be changed without necessarily changing the nozzle body, too.

7 Claims, 3 Drawing Sheets

PLASTICIZING ASSEMBLY FOR USE IN AN INJECTION MOLDING MACHINE FOR PROCESSING SYNTHETIC MATERIALS

BACKGROUND OF THE INVENTION

1. Field of the Invention

This invention relates to a plasticizing assembly for use in an injection molding machine for processing synthetic materials, comprising a plasticizing cylinder at which a nozzle body is mounted and that is provided with a rotatable feed screw disposed in a cylindrical chamber with an inside diameter substantially corresponding to the diameter of the feed screw. The inside diameter of the nozzle body section is tapered to the inside diameter of a nozzle channel, taking as a starting point the rear end diameter of a transition section between the plasticizing cylinder and the nozzle body.

2. Description of the Prior Art

A plasticizing cylinder of this kind is, for example, known from German Patent 41 05 731. In general, and also in the case of the plasticizing cylinder mentioned before, it is unusual to use plasticizing cylinders with different inner diameters for different feed screw diameters. Since the diameter at the transition toward the nozzle body is formed in dependance on the diameter of the feed screw, to ensure a continuous surface area, especially in the transition section, it is necessary to assign to each respective plasticizing cylinder only one nozzle body. Therefore each time the plasticizing cylinder is changed, the nozzle body also has to be changed. This contributes considerably to increased costs, because every time a plasticizing cylinder has to be changed, a nozzle body also has to be placed at disposal. This is the case even if the outside diameter has remained unmodified, since, for example, the same type of heating collars are arranged on the surface of the respective plasticizing cylinder. Although the nozzle body would fit perfectly on the new plasticizing cylinder as to its connecting means, it is nevertheless necessary to exchange it together with the plasticizing cylinder.

From German Published Patent Application 21 21 270 it has been known for a long time to build the injection head of screw-type extruding machines by stringing together different discs. This is necessary to shape the extruded column before it leaves the injection head. The complicated shape of the inner injection head basically makes refrigeration more difficult, particularly for the temperatures applied in this case. Also the cleaning of this region is made more difficult. These are the two principal reasons for the suggestion to dismember the injection head into corresponding discs. Because the different material types applied require different conformations of the inner injection head, they are not destined to constitute a transition section between a plasticizing cylinder and a nozzle body.

SUMMARY OF THE INVENTION

It is an object of the invention to provide a plasticizing assembly which is of the kind described first hereinbefore, that if a plasticizing cylinder change is necessary or desired, makes it possible to only exchange the plasticizing cylinder itself and not the nozzle body section together with it.

That object is accomplished in accordance with the invention in that the transition section is provided with a chamber in which an adapter having an outlet transversely disposed with respect to an injection axis is located, whereby the adapter adapts the inner diameter of the chamber to the rear end diameter of the transition section.

In such an arrangement the nozzle body still has to be detached from the plasticizing cylinder; however, it is possible to fix it at the exchanged plasticizing cylinder again, after the exchange has been realized. The most essential aspect is that an adapter is provided between the final diameter of the inner chamber in the plasticizing cylinder in which the feed screw is placed and the rear end diameter of the nozzle body, having the task to blend both borders. By this the basic conditions are created for using the one and same nozzle body for a plurality of plasticizing cylinders with different inner diameters. For the buyer of the injection molding machine this has the advantage that costs as well as spatial requirements, which otherwise would be high because of the plurality of nozzle bodies needed, can be reduced. Basically, it does not matter if the adapter is assigned to the nozzle body or to the plasticizing cylinder and whether it is limited to an area adjacent to the inner diameters or if it extends to the exterior area of the nozzle body and plasticizing cylinder. By this the basic conditions are created for leaving the drive mechanisms for a shut-off nozzle unmodified, so that the adapter can be used for shut-off nozzles and for open nozzles as well.

According to a preferred feature, an adapter ring, which is placed at the nozzle body, is provided as the adapter, whereby its opening side turned towards the plasticizing cylinder corresponds to the inner diameter of the chamber and its opening side turned towards the nozzle body corresponds to the rear end diameter of the nozzle body. The chamber is provided as a circular recess at the nozzle body, the recess being symmetrically disposed with respect to the injection axis and holding the adapter ring. The recess mentioned is located between two bores acutely disposed with respect to the injection axis, which are suitable to receive an injector needle and a thermal probe. Due to this arrangement it is now possible to only exchange the plasticizing cylinder, which reduces production costs in so far as the same nozzle body can be used nearly for all different plasticizing cylinders. Furthermore, costs are reduced since the circular recess has to be created only at the nozzle body and not at the plurality of plasticizing cylinders. To avoid expansion of the chamber that is exposed to high pressures, the rear end diameter of the nozzle body basically is chosen so small that in a huge number of cases it does not exceed the diameter of even a small feed screw.

According to a preferred feature, the depth of the recess is slightly smaller than the thickness of the adapter, so that when the nozzle body is pressed against the plasticizing cylinder a junction between the adapter and the pressed-together parts is created. Since there are no gaps left between the parts that have been joined into which material or corrosive gases could penetrate, a further compacting of the parts linked together, especially when high temperatures are applied, is avoided. It should be considered that now and even more so in the future, in the ceramic industry, materials will be processed that require high temperatures. Furthermore, the inner surfaces of the chamber, the adapter and the nozzle channel constitute a continuously blended surface area. Besides, the inner surfaces have edges at transition surfaces placed between the chamber and the adapter, and between the adapter and the nozzle body as well, with all of the edges being disposed perpendicularly with respect to the transition surfaces. On the one hand this makes possible an easier processing during production, and on the other hand facilitates the detachability, since in such an arrangement the meeting front parts of the parts to be joined always are disposed vertically with respect to the surface area, so that the probability that material could penetrate is reduced to a minimum. All of the above mentioned constructional measures contribute to reduce the points at which possible "cakings" might arise.

According to a preferred feature a coupling sleeve surrounding and partially covering the nozzle body is fixed at the plasticizing cylinder, whereby the coupling sleeve is penetrated by a plurality of threaded bolts engaged in the coupling sleeve and supported at the front side of the nozzle body. Such an arrangement creates the basic conditions necessary for a quick detachment of the nozzle body from the plasticizing cylinder. On the one hand the force which has to be generated in order to press the parts together is lessened by the plurality of threaded bolts, and on the other hand the threaded bolts are disposed in an area, which is not so strongly exposed to heat and corrosive attacks as an area lying further inside.

Finally, the whole embodiment creates the conditions for a modular construction design according to a preferred feature comprising plasticizing cylinders with different inner diameters but having identical connecting means on a face for connection of a nozzle body and feed screws with a diameter substantially corresponding to the inner diameter of the plasticizing cylinder and being insertable into the plasticizing cylinder. Furthermore, the invention comprises at least one nozzle body having a rear end diameter and is provided with connecting means that permit a continuous connection with the plasticizing cylinder, as well as adapter rings which are at least associated to the respective plasticizing cylinders and which adapt the different inner diameters to the rear end diameter of the nozzle body. In such an arrangement it is possible to build-up a plurality of different parts, whereby the rest of the parts provided on the machine, as for example the drive units for the injector needle, as well as the injector needle itself and the thermal probe, can be furthermore used without need of modifying them. Basically it is not necessary anymore to dismount such parts from the nozzle body.

These and other objects and aspects of the invention are better understood with reference to the detailed description and accompanying drawings, and it will be understood that changes in the specific structure shown and described may be made within the scope of the claims without departing from the spirit of the invention.

DETAILED DESCRIPTION OF THE PREFERRED EMBODIMENTS

The invention will now be described in more detail by example with reference to the embodiments shown in the Figures. It should be kept in mind that the following described embodiments are only presented by way of example and should not necessarily be construed as limiting the inventive concept to any particular physical configuration.

Figure 1:
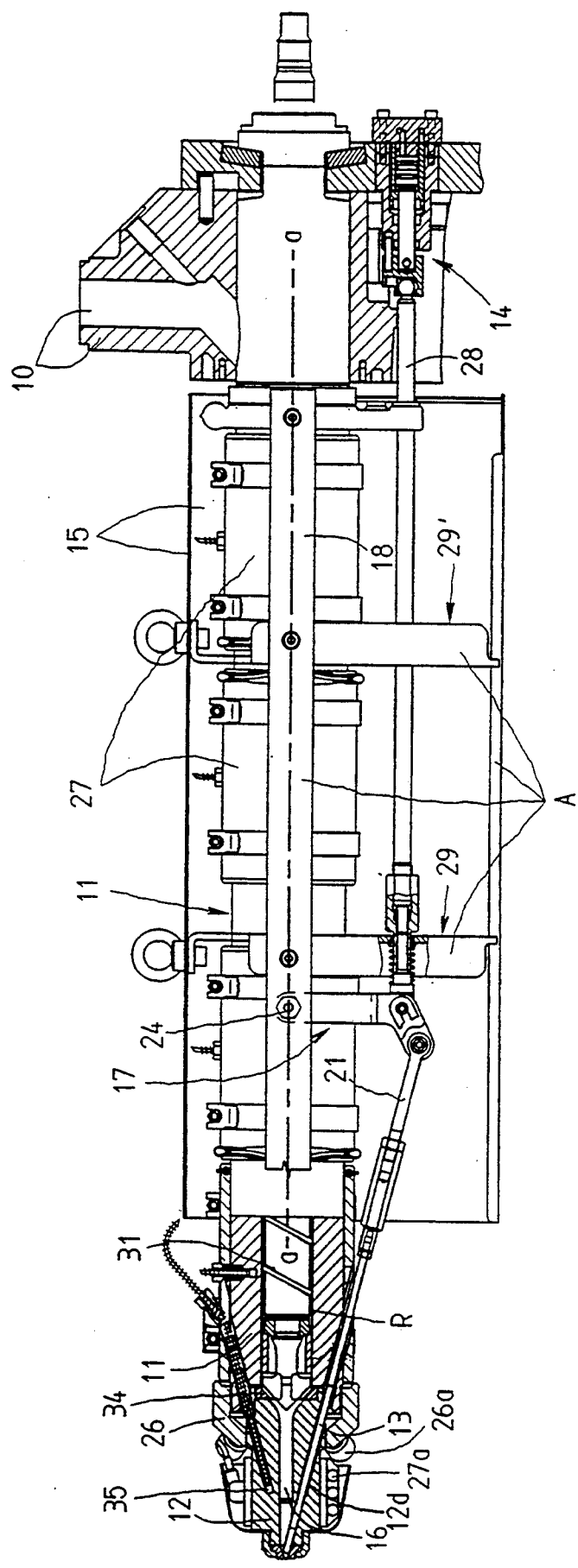
FIG. 1 is a side view of a partial vertical sectional view of a plasticizing cylinder.

FIG. 1 shows the plasticizing cylinder 11, which in the rear is held by a carrier block 10 and surrounded by a protective skeleton A. The plasticizing cylinder 11 protrudes from the protective skeleton A on its face. The protective skeleton comprises mounting elements 29, 29' provided with bores in which the plasticizing cylinder is fixed and furthermore bearing guard plates 15, which surround the plasticizing cylinder in its middle section with a rectangular cross section. Additionally, the protective skeleton comprises rods 18, on which the plasticizing cylinder is supported on stationary rollers for advancing it to the injection mold.

The plasticizing cylinder is provided on its face with a nozzle body 12, having at its forward end a nozzle orifice 12a which is locked by an injector needle 13, the injector needle being acutely disposed with respect to the injection axis a—a. A hydraulic drive cylinder 14 for displacing the injector needle 13 into its respective closed and opened positions is disposed in the area of carrier block 10. The injector needle 13 is actuated by the drive cylinder 14 by means of bar-shaped elements 28, 21, whereby a swivelling lever 17, which is rotatable around an axis 24, bears the force transmitting bridge constituted by the bar-shaped elements.

Inside the plasticizing cylinder a cylindrical chamber R is provided, in which a feed screw 31 is rotatably disposed. The inside diameter d, d' of this chamber R substantially corresponds to the bore diameter of the cylinder. This inside diameter is tapered inside the nozzle body to the inside diameter of the nozzle channel 16 and the nozzle orifice 12a, respectively, taking as a starting point the inside diameter d at the forward end of the plasticizing cylinder. A chamber is provided in the transition section between plasticizing cylinder 11 and nozzle body 12 for spatial fixing of an adapter, which has an outlet transversely disposed with respect to the injection axis, whereby the adapter adapts the inner diameter of the chamber R to the rear end diameter of the nozzle body 12. The rear end diameter e of the nozzle body basically is small, so that for a huge number of cases it does not exceed the inside diameter d of the chamber R even if the smallest feed screw 31 is used.

Figure 3:
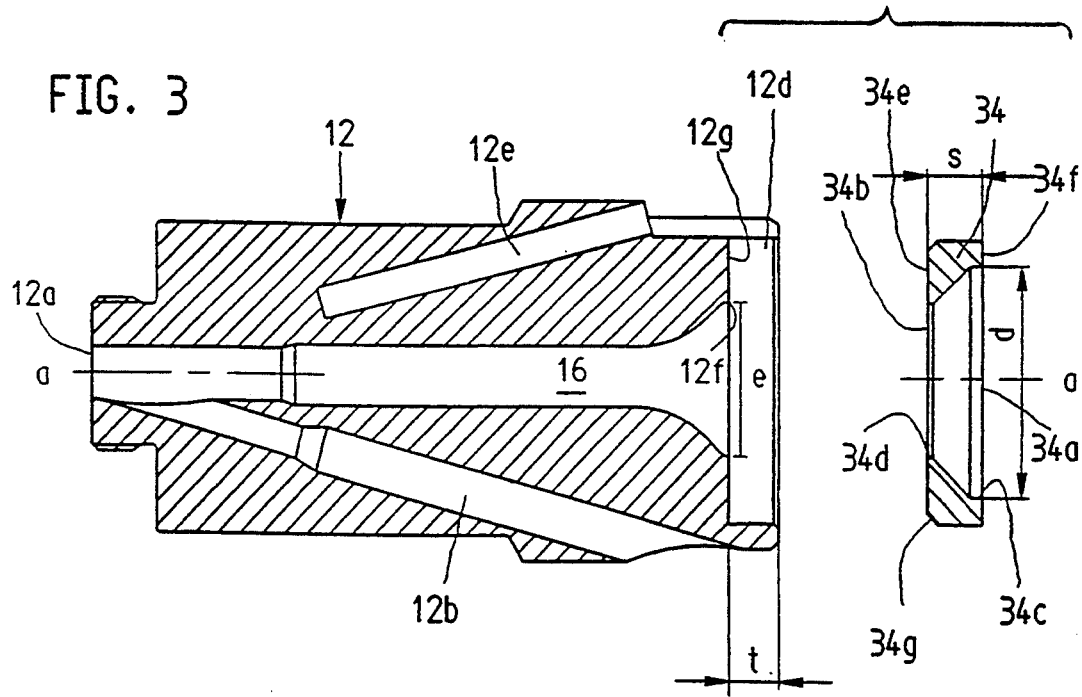
FIGS. 3 and 4 are sectional views of the nozzle body with two different adapter rings.
Figure 4:
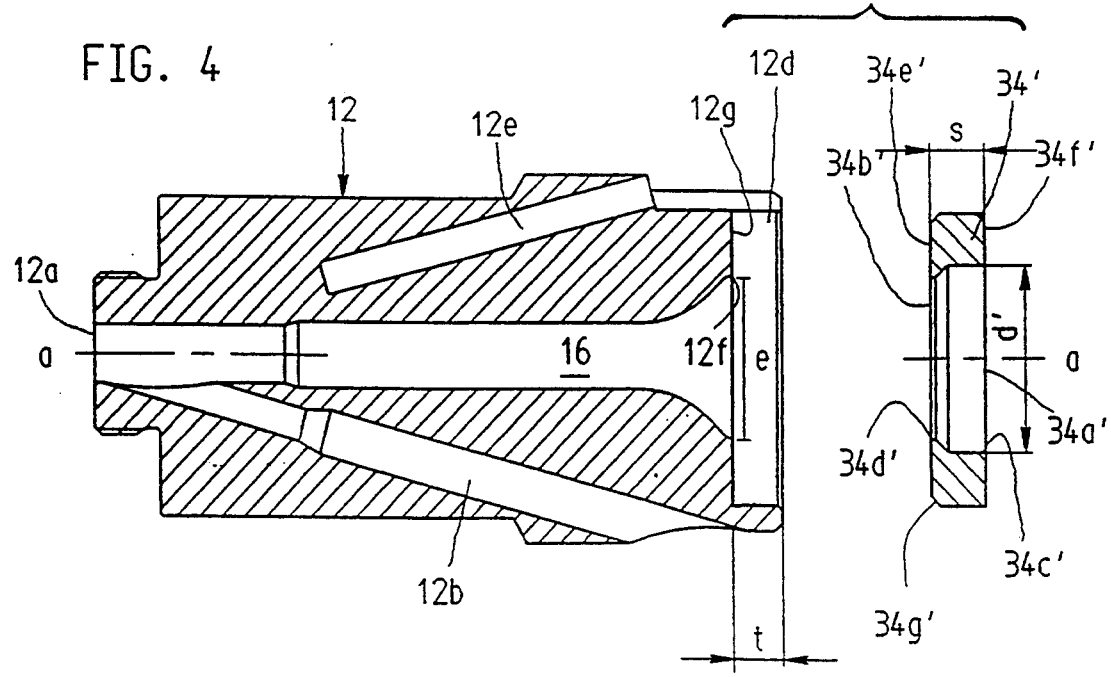

An adapter ring 34, 34' is provided as an adapter. The illustrations in FIGS. 3 and 4 show two different adapter rings for an identical nozzle body 12. The adapter ring of FIG. 3 is provided for the feed screw 31 having a larger diameter than the one for which the adapter ring seen in FIG. 4 is intended. When comparing the FIGS. 3 and 4, it is apparent that because of the adapter, chamber R is more prolonged the smaller the mounted feed screw is, since the adaptation of the different inside diameters d, d' to the rear end diameters e of the nozzle body 12 takes place in the area of the adapter ring directly adjacent to the nozzle body. The difference between FIGS. 3 and 4 is merely with respect to the adapter rings 34, 34', whereby the identical parts of the adapter ring basically are marked with the same reference character and parts of the same kind are distinguished by a prime mark.

In both cases the opening side 34a, 34a' of the adapter ring 34, 34' turned towards the plasticizing cylinder corresponds to the inside diameter d, d' of the chamber R and thus substantially to the diameter of the feed screw 31 and to the cylinder bore. The opening side 34b, 34b' of the adapter ring 34, 34' turned towards the nozzle body corresponds to the rear end diameter of the nozzle body 12.

In the following execution example a circular recess 12d at the nozzle body 12 is provided as a chamber for fixing the adapter ring, the recess 12d being disposed symmetrically with respect to the injection axis a—a. Basically, it would be possible to arrange the chamber for fixing the adapter at the plasticizing cylinder 11 or to design the adapter ring in a way that it reaches up to the exterior area of the plasticizing cylinder 11 or nozzle body 12, where it would be engaged or penetrated between the plasticizing cylinder and the nozzle body by the corresponding connecting means. In the present example the circular recess 12d is placed between two disposed bores 12b, 12e, which are determined to receive the injector needle 13 and the thermal probe 35. Bores 12b, 12e form acute angles relative to injection axis a—a.

The depth t of the recess 12d is slightly smaller than the thickness s, s' of the adapter ring 34, 34', so that when the nozzle body and the plasticizing cylinder 11 are pressed together, an intimate connection between the parts to be joined, i.e., between nozzle body 12, adapter ring 34, 34' and plasticizing cylinder 11, is ensured.

Figure 2:
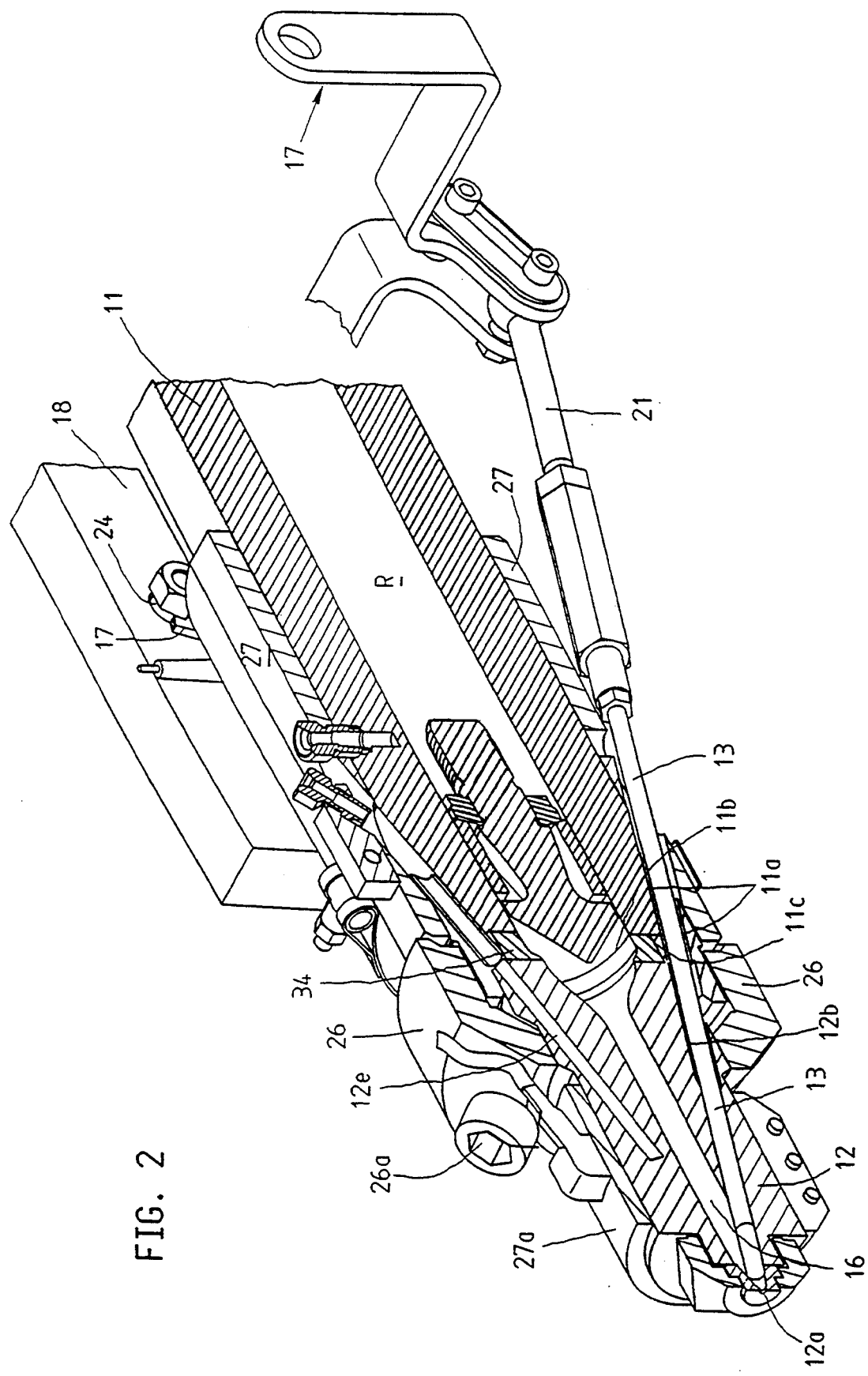
FIG. 2 shows the nozzle side section of the plasticizing cylinder in an enlarged and perspective view.

As is especially apparent from FIG. 2, all parts when assembled constitute a continuously blended surface area taking as a starting point the chamber R and continuing with the respective adapter rings 34, 34' to the nozzle channel 16. However, in order to facilitate both the treatment and the later detachability of the individual parts, the transition surfaces towards the respective front parts, 11c, 12g, 34e, 34f, 34e', 34f', 12g' are provided with edges 11b, 34c, 34c', 34d, 34d', 12f, 12f' which are vertically placed with respect to the transition surfaces. The front parts themselves are only finish-machined in a small ring-shaped area adjacent to the inner surface area of the plasticizing cylinder. In such an arrangement the contact pressure required for connection of the nozzle body 12 and the plasticizing cylinder 11 is reduced many times over and an optimum connection of the parts is guaranteed even if lower pressures are applied.

In order to counteract difficulties during assembly right from the beginning the adapter ring has edgings 34g, 34g' at the front parts 34e, 34e', which are turned towards the nozzle body. In this example the connection of the nozzle body 12 and the plasticizing cylinder 11 is made by means of a plurality of threaded bolts 26a, which together with a coupling sleeve 26 ensure the proper connection of both parts. The coupling sleeve 26, surrounding and partially covering the nozzle body, is fixed at the plasticizing cylinder 11 by an interior thread, which fits over a corresponding exterior thread provided on the plasticizing cylinder. The threaded bolts 26a are axially supported at the coupling sleeve 26 and are threaded into corresponding threads. The threaded bolts 26a engage in compression surfaces at the nozzle body, so that when they are tightened the nozzle body is pressed against the plasticizing cylinder.

The thread connection, which cannot be broken off, represents a thermal bridge between the coupling sleeve and the plasticizing cylinder during the nozzle change; however, the temperature in the area around the threaded bolts is below the relatively high temperature in the nozzle body and the plasticizing cylinder. Since the threaded bolts are essentially shorter than the one usually applied in such connections, corrosive gases cannot cause damage, as usually occurs in the known plasticizing cylinders. The plurality of threaded bolts 26a makes it possible to easily exchange the nozzle body, requiring less physical force and using light tools that are easy to handle. The assembly-service staff can carry the tools in a briefcase.

Many connections can be provided between the nozzle body and the plasticizing cylinder. If plasticizing cylinders with different inside diameters d, d' are used, to which usually at least one nozzle body 12 is assigned, preferably the connecting means at the plasticizing cylinder for connection of the nozzle body 12 are always the same.

Thus, the conditions for a modular system having a modular construction of the plasticizing cylinder are created, and having at least one nozzle body 12 with connecting means for connection to plasticizing cylinders having different inside diameters d, d', but using identical connecting means on the face for connection of the nozzle body 12. Adapter rings associated to the respective plasticizing cylinder 11, which adapt the different inside diameters d, d' to the rear end diameter of the nozzle body 12, are provided. The plasticizing cylinder 11 as well as the nozzle body 12 can always be fitted out with identical heating collars 27, 27a.

It will be understood that the above description of the present invention is susceptible to various modifications, changes and adaptations, and the same are intended to be comprehended within the meaning and range of equivalents of the appended claims.

I claim:

1. In a plasticizing assembly for use in an injection molding machine for processing synthetic materials, comprising:

a plasticizing cylinder;

a nozzle body including a nozzle channel and a nozzle orifice;

clamping means for clamping said nozzle body to said plasticizing cylinder, said plasticizing cylinder, said nozzle channel and said nozzle orifice defining an injection axis;

a transition section formed between said plasticizing cylinder and said nozzle body;

a rotatable feed screw being arranged in a cylindrical chamber that extends through said plasticizing cylinder and said nozzle body, said cylindrical chamber having a first inside diameter which substantially corresponds to the diameter of said feed screw, a second inside diameter in said nozzle body, and a tapered region therebetween that is tapered inward to the inside diameter of said nozzle channel from a rear end diameter in said transition section between said plasticizing cylinder and said nozzle body;

a recess within said transition section; and an adapter having an outlet transversely disposed with respect to said injection axis and being located in said recess, whereby said adapter adapts said inner diameter of said cylindrical chamber to said rear end diameter of said transition section;

the improvement wherein said adapter is fittedly pressed in said recess and pressed between said nozzle body and said plasticizing cylinder by engaging said clamping means and wherein said clamping means connects together said adapter, said nozzle body and said plasticizing cylinder.

2. The plasticizing assembly set forth in claim 1, wherein said recess is located between two bores acutely disposed with respect to said injection axis, which are suitable to receive an injector needle and a thermal probe.

3. The plasticizing assembly set forth in claim 1, wherein the depth of said recess is slightly smaller than the thickness of said adapter.

4. The plasticizing assembly set forth in claim 1, wherein inner surfaces of said cylindrical chamber, said adapter and said nozzle channel constitute a continuously blended surface area and have edges at transition surfaces placed between said cylindrical chamber and said adapter and between said adapter and said nozzle body, all of said edges being disposed perpendicularly with respect to said transition surfaces.

5. The plasticizing assembly set forth in claim 1, wherein front parts of said nozzle body, said adapter and said plasticizing cylinder are only finish-machined in a small ring-shaped area adjacent to an inner surface area of said plasticizing cylinder.

6. The plasticizing assembly set forth in claim 1, wherein said clamping means comprises a coupling sleeve surrounding and partially covering said nozzle body, said sleeve being fixed to said plasticizing cylinder, whereby said coupling sleeve is penetrated by threaded bolts and supported at the front side of said nozzle body.

7. A plasticizing assembly for use in an injection molding machine for processing synthetic materials, comprising:

a plasticizing cylinder;

a nozzle body including a nozzle channel and a nozzle orifice and being mounted on said plasticizing cylinder, said plasticizing cylinder, said nozzle channel and said nozzle orifice defining an injection axis;

a transition section formed between said plasticizing cylinder and said nozzle body;

a rotatable feed screw being arranged in a cylindrical chamber that extends through said plasticizing cylinder and said nozzle body, said cylindrical chamber having a first inside diameter which substantially corresponds to the diameter of said feed screw, a second inside diameter in said nozzle body, and a tapered region therebetween that is tapered inward to the inside diameter of said nozzle channel from a rear end diameter in said transition section between said plasticizing cylinder and said nozzle body;

a recess within said transition section in which an adapter having an outlet transversely disposed with respect to said injection axis is located, whereby said adapter adapts said inner diameter of said cylindrical chamber to said rear end diameter of said transition section; and a coupling sleeve surrounding and partially covering said nozzle body and being fixed at said plasticizing cylinder, whereby said coupling sleeve is penetrated by threaded bolts engaged in said coupling sleeve and supported at a front side of said nozzle body.

* * * * *